Figure 1:
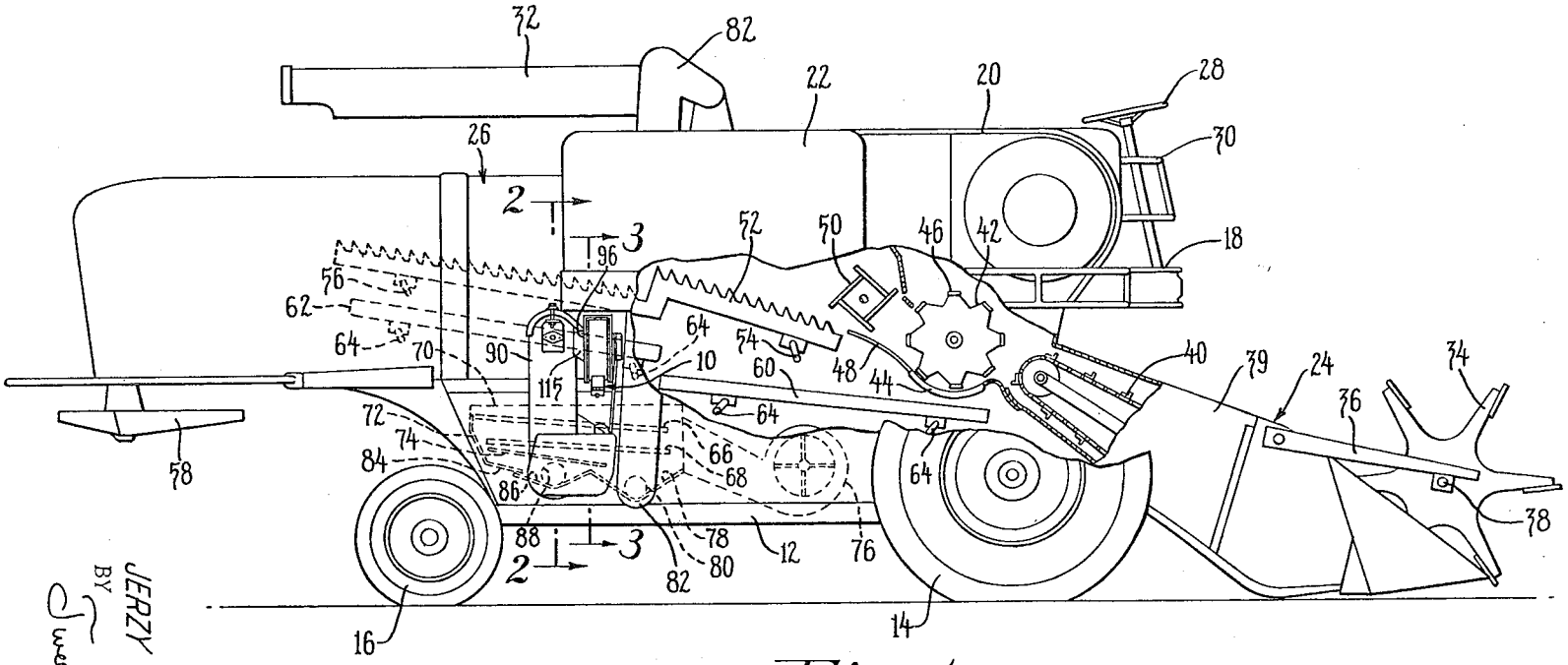
Figure 2:
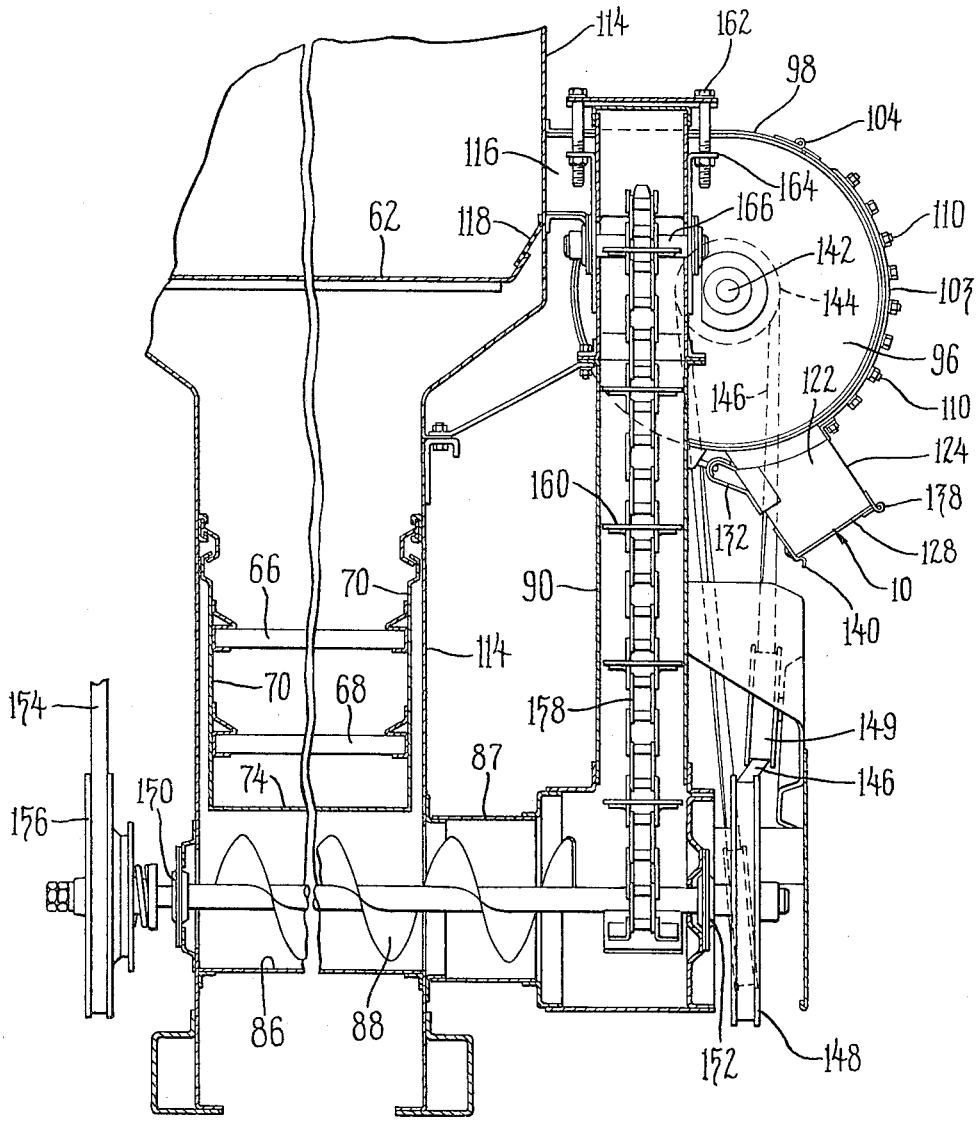
Figure 3:
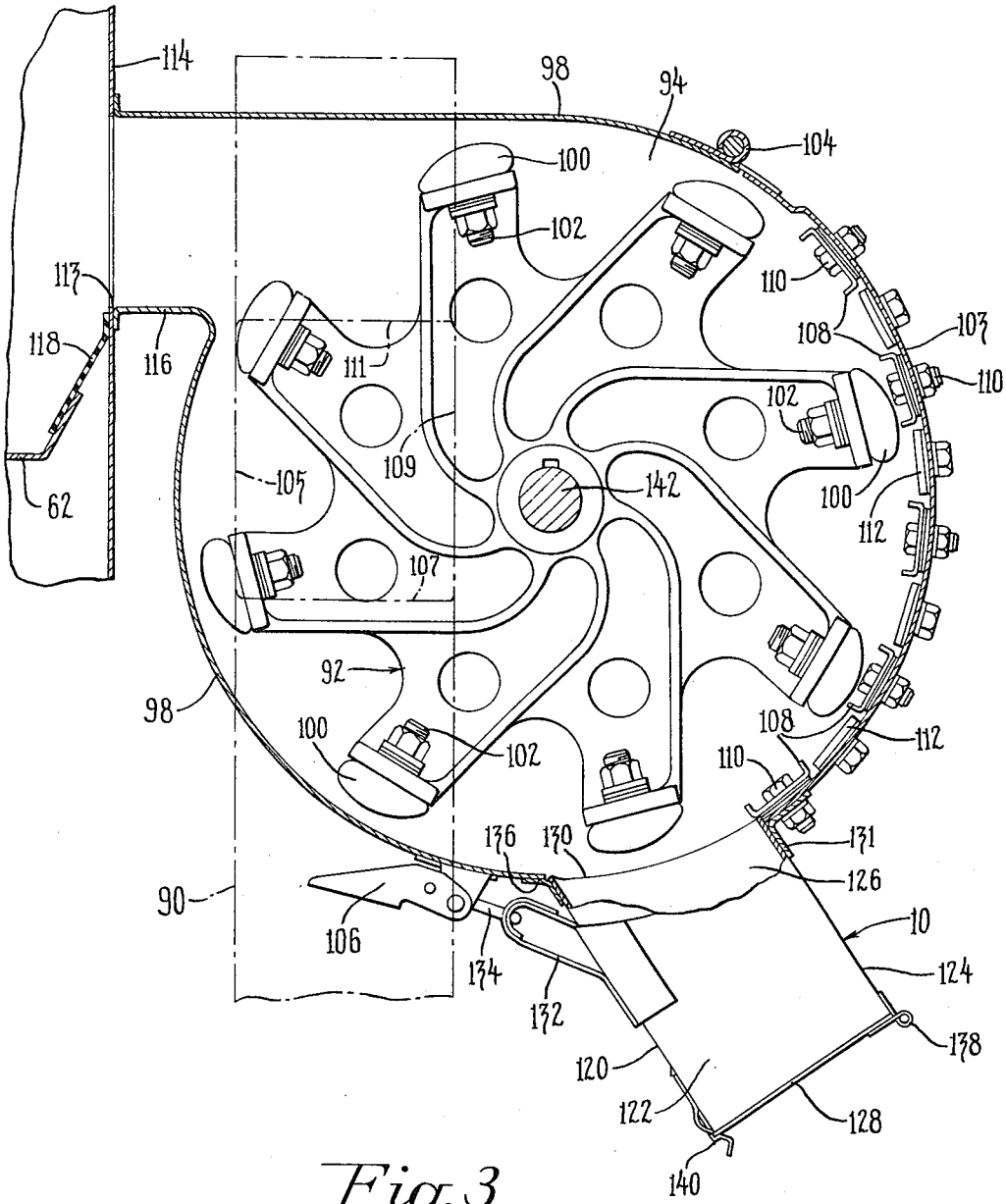

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 31, 1970

872 O.G. 1411

T872,011

TAILINGS RETHRESHER STONE TRAP

Robert Ashton, Islington, Ontario, and Jerzy M. Brzustowski, Toronto, Ontario, Canada, assignors to Massey-Ferguson Industries Limited, Toronto, Ontario, Canada, a corporation of Canada

Filed Apr. 1, 1969, Ser. No. 812,122

**Int. Cl. A01f *12/18***

U.S. Cl. 130—27

3 Sheets Drawing. 9 Pages Specification

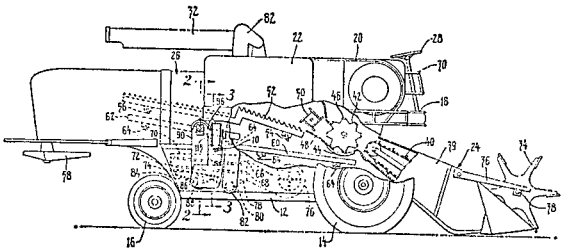

A combine harvester thresher with an auxiliary cylinder and concave for rethreshing the tailings and a stone trap to protect the rethresher from damage by rocks and other hard objects in the tailings. The stone trap is a box with an open top in communication with an opening in the rethresher. Hard objects such as rocks are driven into the stone trap by the rotating cylinder in the rethresher. A door on the stone trap can be opened to remove the hard objects.

March 31, 1970 R. ASHTON ET AL T872,011

TAILINGS RETHRESHER STONE TRAP

Filed April 1, 1969 3 Sheets-Sheet 1

INVENTOR.
JERZY M. BRZUSTOWSKI
BY ET AL
Tweedale & Gerhardt
ATTORNEYS.

TAILINGS RETHRESHER STONE TRAP

Filed April 1, 1969 3 Sheets-Sheet 2

INVENTOR.
JERZY M. BRZUSTOWSKI
BY ET AL
Tweedale & Gerhardt
ATTORNEYS.

TAILINGS RETHRESHER STONE TRAP

Filed April 1, 1969 3 Sheets-Sheet 3

INVENTOR.
JERZY M. BRZUSTOWSKI
BY ETAL
Tweedale & Gerhardt
ATTORNEYS.